Patented Sept. 16, 1924.

1,508,569

UNITED STATES PATENT OFFICE.

WILLIAM B. NEWKIRK, OF RIVERSIDE, ILLINOIS, ASSIGNOR TO CORN PRODUCTS REFINING COMPANY, OF NEW YORK, N. Y., A CORPORATION OF NEW JERSEY.

GRAPE SUGAR.

No Drawing. Original application filed November 16, 1922, Serial No. 601,302. Divided and this application filed June 25, 1923. Serial No. 647,750.

*To all whom it may concern:*

Be it known that I, WILLIAM B. NEWKIRK, a citizen of the United States, residing at Riverside, in the county of Cook and State of Illinois, have invented certain new and useful Improvements in Grape Sugar, of which the following is a specification.

My invention relates to the manufacture of grape sugar from starch, corn starch more particularly, and its object is the production of a crystalline grape sugar or dextrose either of the anhydrous or of the hydrate type, but more especially the latter which is to be preferred for reasons to be stated, which product shall be white and substantially free from impurities that is to say, which will contain preferably more than a fraction of one per cent of the impurities of the converted material and substantially no other extraneous or foreign matter of any sort.

This application is a division of my copending application Serial No. 601,302, filed November 16, 1922 (Patent No. 1,471,347, October 23, 1923).

The preferred hydrate product is manufactured as follows: The starch, corn starch preferably on account of its relatively low cost, is first converted by the usual process of acid hydrolysis in which conversion is carried a far as economically feasible, say to 90% dextrose (based on dry substances). The converted liquor is then purified preferably by being passed through bone char filters. The liquor will ordinarily have a density of aproximately 30° Baumé. The next step is to concentrate the liquor which may be accomplished in a vacuum pan of any preferred type. The concentration is carried to a density of from 38° Baumé to 45° Baumé. The preferable density, for the average operation, is 40° Baumé. The density of the liquor should be as high as possible in order to shorten the period of crystallization. But if it is too high the liquor may become so viscous as to be unworkable and there is also danger of producing a degree of supersaturation which may cause false grain. The tendency of the liquor to become viscous when concentrated is due to the presence of dextrine and other impurities. Therefore, the extent to which concentration can be carried will depend upon the character of the converted liquor, its purity, the extent to which conversion has been carried, and the nature of the unconverted or partially converted products therein. These conditions will vary for different batches.

From the vacuum pan the concentrated liquor is introduced into a suitable crystallizing vessel. This vessel is preferably water jacketed and is provided with an agitator. The liquor is seeded with hydrate dextrose crystals and is cooled in the crystallizer down to a temperature of from 95° to 105° Fahrenheit and held within such range of temperatures until crystallization is completed, an operation ordinarily requiring about thirty hours but sometimes a longer period up to sixty hours, depending upon the character of the sugar liquor treated.

The liquor will ordinarily be relatively hot as it comes from the vacuum pan. It may have a temperature of about 140° Fahrenheit. It is cooled rapidly down to the desired crystallizing temperature, 95° to 105° Fahrenheit in any suitable manner, for example, by the circulation of cold water through the water jacket of the crystallizer. It may be maintained at this temperature by the circulation of warm water through the jacket. During the period of crystallization the liquor is kept in relatively slow movement by means of the agitator above referred to.

If the liquor introduced in the crystallizer has a density of 40° Baumé (this and the other densities being based upon a temperature of 100° Fahrenheit, as is customary in the art) the best temperature for crystallization is 100° Fahrenheit. There is a direct relationship between the temperature of crystallization and the density of the liquor. If the liquor is heavier than 40° Baumé the temperature should be higher than 100° Fahrenheit. If the density is less than 40° Baumé the temperature should be lower. The upper limit of density, however, is fixed by the character of the liquor as above set forth, and it is not practical to use a liquor substantially lighter than 38° Baumé because with the lower gravity, the crystallizing operation is much prolonged and this is undesirable for economic reasons and because of the tendency of the dextrose to form relatively small or deformed crystals at the lower temperatures. From the point of view of economy it should be the aim to crystallize at the highest practical density and temperature. All my experience goes to show that in order to obtain satisactory results crystallization must take place, for hydrate sugar, within the ranges of densities and temperatures given, namely, 38° to 45° Baumé and 95° to 105° Fahrenheit.

The liquor is cooled artificially and as quickly as is possible in order that it should pass as rapidly as possible through the range of temperatures favorable to the production of anhydrous crystals, anhydrous crystals being formed at a range of temperatures extending from approximately 135° to 110° Fahrenheit.

After the crystallization has taken place the magma is introduced into a centrifugal machine and a separation effected between the crystals and the mother liquor. The crystals may then be washed with water introduced into the centrifugal machine.

The mother liquor thrown out of the centrifugal machine may be re-treated for a second yield of sugar as set forth in my co-pending application above referred to.

The purity of the sugar will depend upon the completeness of the separation effected by the centrifugal machine. This in turn will depend upon maintaining conditions favorable to the production of hydrate crystals of normal crystalline form and relatively uniform as to size and shape and propagated singly, not in intergrown groups or clusters. Under certain conditions the dextrose in a starch converted dextrose solution will crystallize in the form of separate normal hydrate crystals which are quite chunky and hard, so that during the centrifuging operation they are not broken, crushed or matted down by the pressure to which they are subjected, but provide, in the mass, voids through which the mother liquor can escape. Under other conditions the dextrose will crystallize, in part or wholly, in the form of small or flake like or needle like crystals, or mixtures of these forms, which are apparently hydrate crystals but are much deformed. These deformed crystals, or "false grain" if mixed in considerable quantity with the normal hydrate crystals break down and are crushed and matted when the mass is centrifuged, filling the interstices between the normal crystals, so that satisfactory purging from the mass of its mother liquor becomes impossible. If conditions are such, generally, as to produce anhydrous crystals, but are not properly controlled with this end in view, that is if certain factors are favorable to the propagation of the anhydrous type and other conditions to the propagation of the hydrate type, the normal anhydrous crystals will be contaminated by deformed crystals of the small or flake like or needle like kind, which may be hydrate, and in some cases apparently anhydrous, and which make the magma practically unpurgable. The magma is also difficult if not impossible to purge if the crystals instead of being propagated as separate, unitary bodies of homogenous crystalline structure and characteristic geometrical configuration are allowed to grow in groups or conglomerations of interlaced crystals. In the latter case a certain amount of mother liquid with its impurities is occluded by the conglomerate masses which are of nodular or wart like appearance and result in pellet like forms in the finished product. Moreover the conglomerations break down in the centrifugal machine, so that, for both the reasons stated, the complete purging of the mother liquid is impossible and a relatively large percentage of impurities in the finished product is the result. By the term "separate, unitary crystalline bodies," I do not mean to exclude naturally produced multiple crystal forms resulting from the process of twinning on one or more of the axes of the nucleus crystal; nor do I mean to imply that in the product the crystals may not be in a more or less fragmentary condition. Fracture of the crystalline bodies may take place through agitation in the crystallizer, or in the centrifugal machine, or later in the handling of the sugar. I do mean to exclude, however, by this term, conglomerate masses or bodies formed by the growing together or interlacing of crystal groups propagated from more than one nucleus. According to my invention the particles are separate, unitary crystals produced through natural growth in the process of crystallization and are homogeneous with respect to their crystalline structure in contradistinction to being agglomerations of crystalline bodies; and this homogeneity of crystalline structure is obvious in the finished product in distinction to the pellet like form of the relatively impure corn sugar heretofore produced. Efforts heretofore to produce a high purity grape sugar have failed because of ignorance as to these necessary conditions.

Assuming that hydrate dextrose is to be produced the following conditions seem to be necessary to success: Hydrate crystals to the substantial exclusion of the anhydrous type should be used as seed. The magma should be kept in motion in order to maintain the seed and induced crystals in suspension and uniformly dispersed throughout the solution. The temperature should be relatively low, that is within what may be termed the hydrate range, which is below the temperatures favorable to the production of anhydrous crystals, but not low enough to bring about the formation of false grain to-wit the small or flake like or needle like crystals referred to. The limits of this temperature range will however vary somewhat in accordance with the character as to purity of the converted liquor used, the density of the liquor and other variable factors in the process as it may be carried on in different establishments or under different operating conditions.

When the principles of operation as above outlined are observed it is possible to obtain hydrated crystalline grape sugar which will be white and have a purity of between 99% and 100% calculated on the basis of dry substances excluding water of crystallization. I have produced grape sugar of this type having a purity as high as 95% and it is possible to obtain regularly a purity of 99.7% or somewhat higher. Such impurities as remain in the product are ash from the neutralization step following conversion and mineral substances in the water used together with the vegetable impurities of the starch such as traces of unconverted dextrine, reversion products and converted protein. It is the impurities of this character which give the grape sugars heretofore produced their bitter taste and brownish or yellowish color. A very small quantity of the impurities will affect both color and taste, especially the latter. In a 98% sugar the bitter taste and also discoloration are quite noticeable and are appreciable even if there be one per cent of impurities; while if the impurities are reduced to a fraction of one per cent, preferably to less than one-half of one per cent, the sugar is not only pure white but there is no bitter taste that can be detected. When the impurities are reduced to the extent contemplated by the invention, they are, in fact, entirely negligible, whereas even a slightly larger amount of the impurities will totally change the character of the product in respect to taste particularly, and naturally lessen its value commercially. Apparently when the impurity content is reduced to a fraction of one per cent the mother liquor has been completely eliminated, to all intents and purposes, the remaining impurities being tasteless and colorless solids not removed by the centrifuging operation which as stated involves preferably washing with water. Moreover, the sugar will stay in this condition indefinitely. It is quite possible to produce a grape sugar containing a larger percentage of impurities which will be white and free from bitter taste when first made; but in such case discoloration and bitter taste will re-appear after the sugar has been kept for a while. Dextrose in the hydrate form has certain advantages over the anhydrous product because the latter tends to melt when brought into contact with moisture and to recrystallize in lumps as hydrated crystals. That is the anhydrous product will absorb more water when exposed to a humid atmosphere than the hydrated product, and, when dried, will tend to cake or lump; whereas the hydrated product when subjected to a warm moist atmosphere will take up a certain amount of moisture, less than that absorbed by the anhydrous sugar, but in drying readily gives up its excess moisture and retains its crystalline condition. The crystals are of substantially uniform size so that the material is free running and does not tend to pack. They are of naturally formed crystalline structure, not pellet-like agglomerations as in the case of the highest purity grape sugar heretofore manufactured and sold.

In order to manufacture an anhydrous sugar, the same method is followed, except that the crystallization temperature is higher, as specified in the aforesaid application of which this application is a division. That is to say, the converted liquor after concentration to a density of from 38° to 45° Baumé is cooled, in the presence of crystals of the anhydrous type and with the magma in motion, to, and is maintained at, a temperature of preferably from 120° to 110° F., a practical working temperature being 115° F. with the liquor at a density of 41° Baumé.

In referring to the product as consisting of crystals of a single type, to the exclusion of the other type, I mean that the product is made up, substantially at least, of crystals either of the hydrate type or of the anhydrous type to the substantial exclusion of crystals of the other type, in either case. By the term "normal crystals" I intend crystals which are formed under the conditions of operation described herein as necessary for the successful outcome of the manufacture, such crystals being, as stated, chunky and hard, instead of being the flake like or needle like crystals produced under the conditions which my invention seeks to avoid.

I claim:

1. Starch converted dextrose consisting of a mass of separate, unitary crystals of normal crystalline form substantially unmixed with deformed crystals of the needle like or flake like kind.

2. Starch converted dextrose having a purity of ninety-nine per cent or greater and consisting of a mass of separate, unitary crystals of normal crystalline form substantially unmixed with deformed crystals of the needle like or flake like kind.

3. Starch converted dextrose consisting of a mass of separate, unitary, dextrose crystals of dextrose hydrate of normal crystalline form for this type substantially unmixed with deformed crystals of the needle like or flake like kind.

4. Starch converted dextrose having a purity of ninety-nine per cent or greater and consisting of a mass of separate, unitary crystals of dextrose hydrate of normal crystalline form for this type substantially unmixed with deformed crystals of the needle like or flake like kind.

5. Starch converted dextrose consisting of a mass of separate, unitary crystals of substantially one crystal type and of normal crystalline form for that type substantially unmixed with deformed crystals of the needle like or flake like kind.

WILLIAM B. NEWKIRK.